United States Patent [19]
Kashiwagi

[11] Patent Number: 5,230,770
[45] Date of Patent: Jul. 27, 1993

[54] MAKING METHOD FOR HIGH-DENSITY OPTICAL DISK

[75] Inventor: Toshiyuki Kashiwagi, Tokyo, Japan

[73] Assignee: Sony Corporation, Tokyo, Japan

[21] Appl. No.: 824,568

[22] Filed: Jan. 23, 1992

[30] Foreign Application Priority Data

Jan. 23, 1991 [JP] Japan .................... 3-023013

[51] Int. Cl.$^5$ .................... B44C 1/22; C03C 15/00
[52] U.S. Cl. .................... 156/643; 156/659.1; 156/663; 369/277; 428/138; 428/156; 430/321; 430/323
[58] Field of Search .................... 156/643, 654, 659.1, 156/663; 428/64, 156, 167, 138; 369/277, 279, 280, 284-285; 430/272, 321, 323, 325

[56] References Cited

U.S. PATENT DOCUMENTS

| | | | |
|---|---|---|---|
| 4,544,443 | 10/1985 | Ohta et al. | 156/643 |
| 4,747,093 | 5/1988 | Benne et al. | 369/280 |
| 4,818,648 | 4/1989 | Ohta et al. | 430/17 |
| 5,008,176 | 4/1991 | Kondo et al. | 430/272 |

FOREIGN PATENT DOCUMENTS

| | | |
|---|---|---|
| 0411525A2 | 2/1991 | European Pat. Off. . |
| 0418897A2 | 3/1991 | European Pat. Off. . |
| WO88/09990 | 12/1988 | PCT Int'l Appl. . |

Primary Examiner—William A. Powell
Attorney, Agent, or Firm—Hill, Steadman & Simpson

[57] ABSTRACT

In a making method for a high-density optical disk, comprising the step of forming recording pits or recesses for forming the recording pits by etching through apertures of a photoresist layer, a light intensity distribution of an exposure beam spot for forming each aperture through the photoresist layer is made different between a circumferential direction of the optical disk and a direction perpendicular to the circumferential direction, thereby setting a ratio between a length of each pit and a length of each land in respect of the circumferential direction to about 1.1

8 Claims, 7 Drawing Sheets

MAKING METHOD FOR HIGH-DENSITY OPTICAL DISK

BACKGROUND OF THE INVENTION

The present invention relates to a making method for an optical disk such as a video disk or a compact disk, more particularly for a high-density recording optical disk.

In making an optical disk having an information recording portion formed from the presence and absence of recesses or pits, the optical disk is generally obtained by preparing a stamper having a recessed surface according to recording information and molding resin with use of the stamper.

Such a conventional making method for an optical disk using the stamper will now be described with reference to FIGS. 10A to 10D showing the steps of the making method.

Referring to FIG. 10A, a photoresist layer 2 is entirely applied to a smooth surface 1a of a substrate 1 such as a glass substrate, and the photoresist layer 2 is sequentially exposed by scanning a laser beam modulated according to information to be recorded, e.g., signals of "0" and "1". Subsequently, development is carried out to form a plurality of apertures 3 arranged in a desired pattern according to the recording information.

Then, as shown in FIG. 10B, a conductor layer such as Ni is entirely formed on the photoresist layer 2 including the apertures 3 by electroless plating, vapor deposition, sputtering, etc., and a thick metal layer 4 such as Ni is then formed on the conductor layer by electroplating.

As shown in FIG. 10C, the metal layer 4 is separated from the glass substrate 1 to prepare a stamper 5.

As shown in FIG. 10D, resin such as acrylic resin or polycarbonate resin is molded with use of the stamper 5 to obtain an optical disk 7 having a plurality of recesses 6 as information pits arranged in a reverse pattern as transferred from a recessed surface of the stamper 5.

However, each recess or pit 6 of the optical disk 7 thus obtained has a sectionally trapezoidal shape such that opposite side surfaces of each recess 6 are inclined so as to follow the shape of each aperture 3 of the photoresist layer 2. Such inclined side surfaces of each recess 6 causes a problem in reproduction characteristics.

Such inclination of the side surfaces of each recess 6 is generated as follows:

The formation of each aperture 3 through the photoresist layer 2 by pattern exposure of a laser beam will be described with reference to FIGS. 11A and 11B.

In general, when a laser beam hν is condensed and irradiated to the photoresist layer 2 on the glass substrate 1, the laser beam hν is distributed as shown in FIG. 11A. In this case, an intensity distribution of the laser beam hν is shown by a one-dot chain line a in FIG. 11A. Further, an area to be exposed to enable the development under the above condition is an area surrounded by a dashed line b in FIG. 11A. This area has a shape according to the intensity distribution of the laser beam hν.

Accordingly, when the photoresist layer 2 is developed after the exposure, the exposed area mentioned above is made into the aperture 3, which has a sectionally trapezoidal shape such that a width $W_1$ on the side of incidence of the laser beam is larger than a width $W_2$ on the side of the glass substrate 1, that is, at the boundary between the aperture 3 and the glass substrate 1.

To solve the problem due to the sectionally trapezoidal shape of each pit in making the optical disk, the present applicant has proposed an improvement in the making method for the high-density optical disk in Japanese Patent Application No. 1-244463.

FIGS. 12A to 12E show the steps of the making method for the optical disk proposed in the above cited reference. Referring to FIG. 12A, a substrate 1 such as a glass substrate having a surface layer 8 such as Cr is first provided. The surface layer 8 has a thickness t corresponding to a depth of each information pit (recess) to be formed on an intended optical disk, and shows an etching property different from that of the substrate 1 The surface layer 8 is formed by vapor deposition, sputtering, etc. Then, as previously mentioned, a photoresist layer 2 is formed on the surface layer 8, and is exposed and developed to form a plurality of apertures 3. As apparent from FIG. 12A, each aperture 3 has a sectionally trapezoidal shape such that a width $W_1$ of each aperture 3 on the open side thereof is larger than a width $W_2$ of each aperture 3 on the bottom side thereof, as similar to the illustration in FIGS. 11A and 11B.

Then, as shown in FIG. 12B, the surface layer 8 is etched over its whole thickness by perpendicular anisotropic etching such as RIE (reactive ion etching) with the photoresist layer 2 used as a mask. By applying the RIE, the surface layer 8 only is selectively etched, and the substrate 1 itself is not etched or hardly etched. According to this method, the surface layer 8 is etched through the apertures 3 to form a plurality of recesses 9 each having a width corresponding to the small width $W_2$ of each aperture 3 of the photoresist layer 2 and having opposite substantially vertical side surfaces.

Then, as shown in FIG. 12C, after removing the photoresist layer 2, a metal layer 4 such as Ni is entirely formed on the surface layer 8 including the recesses 9, as similar to the illustration in FIG. 10B. Thereafter, the metal layer 4 is separated from the substrate 1 to obtain a stamper 5 having a desired recessed surface according to recording information.

The stamper 5 thus obtained has a plurality of projections each having opposite vertical side surfaces. Accordingly, as shown in FIG. 12E, an optical disk 7 molded by using the stamper 5 is formed with a plurality of pits or recesses 6 each having opposite vertical side surfaces and a width corresponding to the small width $W_2$.

In the optical disk 7 formed in this manner, the pits (recesses) 6 can be made very small to thereby realize high-density recording.

In the making method mentioned above, a light intensity distribution of the laser beam modulated according to recording information is symmetrical with respect to an optical axis, that is, the intensity distribution illustrated in FIG. 11A is uniform in any plane containing the optical axis. In other words, each pit (recess) of the optical disk has the same width corresponding to the width $W_2$ in respect of both a direction of relative movement of a reproducing optical head of an optical disk drive, i.e., a direction along a recording track of the optical disk (which direction will be hereinafter referred to as a circumferential direction or θ direction) and a direction perpendicular to the circumferential direction (which direction will be hereinafter referred to as a radial direction or r direction).

The apertures 3 of the photoresist layer 2 each aperture having the relation of $W_1 > W_2$ in accordance with the above method are arranged with a minimum spacing in relation to the function of the etching mask and other conditions, thereby reducing the pitch to realize high-density recording. However, as shown in FIG. 12E, when a width P corresponding to one signal is minimized, that is, when the sum P of a width $W_P$ of a recess 6 corresponding to a recording portion for information "1" and a width $W_L$ of a land formed adjacent to the recess 6 is minimized, the width $W_P$ becomes smaller than the width $W_L$. Also in respect of the scanning direction of a reading light on the optical disk (i.e., the $\theta$ direction), the relation of $W_P < W_L$ holds, so that a ratio between the width $W_P$ and the width $W_L$ in respect of the $\theta$ direction does not become 1:1, that is, a duty ratio does not become 50%. Accordingly, when the reading light is irradiated onto the optical disk to read the pits or Information, a duty ratio of electrical signals corresponding to the information "0" and "1" does not become 50%, causing a reduction in S/N (C/N).

SUMMARY OF THE INVENTION

It is accordingly an object of the present invention to set the duty ratio of the pits and the lands in respect of the scanning direction of the reading light on the optical disk, i.e., in respect of the $\theta$ direction to about 1:1 or 50%.

As shown in FIGS. 1 and 2, the present Invention provides a making method for a high-density optical disk, including the steps of forming a photoresist layer 12 on a substrate 11, forming a plurality of apertures 13 through the photoresist layer 12 by selective exposure and development according to recording information, each of the apertures 13 having a width on the side of the substrate 11 smaller than a width on the side of incidence of an exposure beam spot, and etching the substrate 11 through the apertures 13 to form a plurality of recesses 19 corresponding to the apertures 13. While the above method is applied to the radial or r direction of the optical disk to reduce a pitch of the recesses 19, the present invention is characterized in that a light intensity distribution of the exposure beam spot for forming the apertures 13 is different between the radial or r direction and the circumferential or $\theta$ direction of the optical disk as shown by a solid-line curve and a dashed-line curve in FIG. 3 so that the width of each aperture 13 formed through the photoresist layer 12 is small in the radial or r direction of the optical disk and large in the circumferential or $\theta$ direction of the optical disk.

As shown in FIG. 2, in respect of the $\theta$ direction of the optical disk, a width $W_P$ of each recess 19 is substantially equal to a width $W_L$ of each land. That is, as shown in FIG. 4 which is a plan view of a part of the optical disk 17, a width of each pit (recess) 16 of the substrate 11 itself or the optical disk 17 obtained on the basis of the substrate 11 is substantially equal to a width of each land in respect of the $\theta$ direction of the substrate 11 or the optical disk 17. That is, a duty ratio in respect of the $\theta$ direction of the optical disk is 1:1.

According to the making method of the present invention, the light intensity distribution of the exposure beam spot to be applied to the photoresist layer 12 is different between the r direction and the $\theta$ direction of the optical disk as shown by the solid-line curve and the dashed-line curve in FIG. 3, so that a width of the exposure beam spot at a light intensity level on the surface of the substrate 11 as shown by a two-dot chain line S in FIG. 3 is small in the r direction and large in the $\theta$ direction. Accordingly, as shown in FIGS. 1 and 2, a width $W_{2r}$ of each aperture 13 on the side of the substrate 11 in respect of the r direction is smaller than a width $W_{2C}$ of each aperture 13 on the side of the substrate 11 in respect of the $\theta$ direction, that is, the relation of $W_{2r} < W_{2c}$ is set.

The recesses 19 are formed by etching the substrate 11 through the respective apertures 13, and in respect of the $\theta$ direction only of the optical disk, the width $W_P$ of each recess 19 is set to be equal or at least substantially equal to the width $W_L$ of each land.

As mentioned above, in case of forming the recesses (pits) 16 as a recording portion for information such as "1" or "0" on the optical disk 17 as shown in FIG. 4, the light intensity distribution of exposure beam to be applied to the photoresist layer 12 is set differentially between the r direction and the $\theta$ direction to thereby make the width $W_P$ of each recess 19 equal or substantially equal to the width $W_L$ of each land, that is, make the duty ration become 1:1 (50%).

As described above, according to the method of the present invention, the duty ratio in the circumferential direction of the optical disk, that is, in a scanning direction of a reading light on the optical disk can be made to 50%, thereby improving an S/N (C/N).

While the light intensity distribution of the exposure beam is made different between the r direction and the $\theta$ direction according to the present invention, the exposure operation is effected by the same exposure beam, and it is prevented from becoming complex.

Other objects and features of the invention will be more fully understood from the following detailed description and appended claims when taken with the accompanying drawings.

DETAILED DESCRIPTION OF THE PREFERRED EMBODIMENTS

Figure 1:
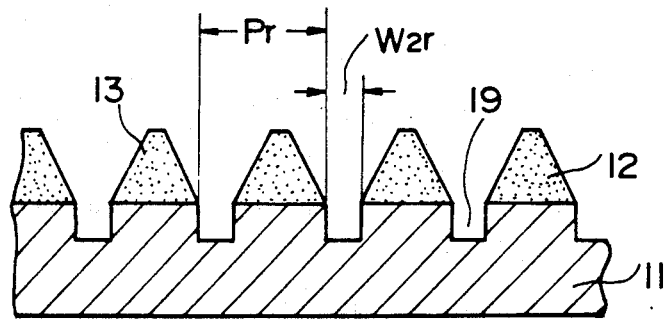
FIG. 1 is a sectional view of an optical disk along the radical or r direction thereof in one step of the making method according to the present invention.
Figure 2:
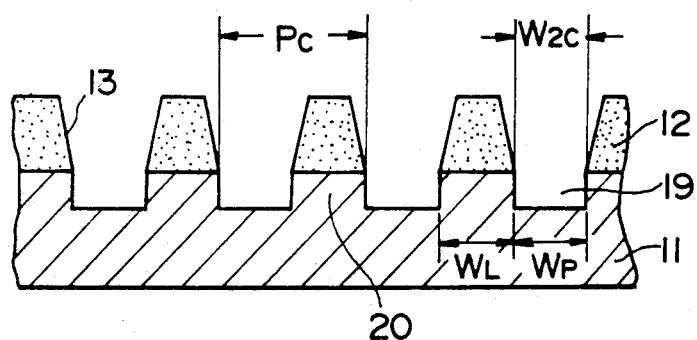
FIG. 2 is a sectional view of the optical disk along the circumferential or $\theta$ direction thereof in one step of the making method according to the present invention.

As shown in FIGS. 1 and 2 which are sectional views of the optical disk along the r direction and the $\theta$ direction thereof, respectively, the photoresist layer 12 of a positive type, for example, is applied on the substrate 11, and it is exposed to light and developed to form the apertures 13.

Then, the substrate 11 is etched through the apertures 13 by RIE having a perpendicular anisotropy, for example, to form the recesses 19. Then, the photoresist layer 12 is removed to obtain the optical disk having the recesses 19 as information pits. In another way, a metal layer such as Ni may be formed on the photoresist layer 12 having the apertures 13 by electroless plating or electroplating, and the metal layer is then separated from the substrate 11 to prepare a stamper and mold the optical disk by using the stamper. Alternatively, a master for forming a plurality of stampers may be formed by plating similar to the above, and then the stampers may be formed by using the master to obtain the optical disk.

The substrate 11 is formed form a glass substrate, for example, and a surface thereof is treated with a silane coupling agent to ensure tight contact of the photoresist layer 12 on the surface of the substrate 11.

Especially in the present invention, the exposure to the photoresist layer 12 is carried out by using a light beam such as a laser beam which is to become on and off or modulated in intensity according to recording information and has different light intensity distributions in respect of the r direction and the $\theta$ direction.

Figure 3:
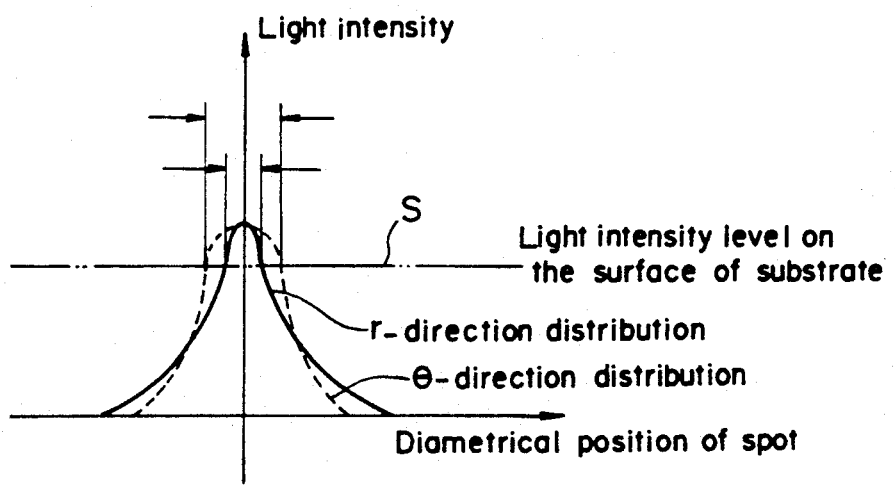
FIG. 3 is a light intensity distribution diagram of an exposure beam in the making method according to the present invention.
Figure 4:
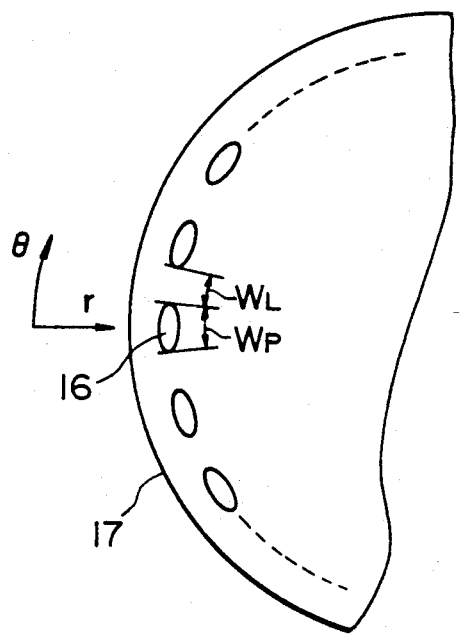
FIG. 4 is a plan view of an essential part of the optical disk to be obtained by the making method according to the present invention.

For example, referring to FIG. 3, the light intensity distribution in respect of the r direction is shown by a solid-line curve, and the light intensity distribution in respect of the $\theta$ direction is shown by a dashed-line curve. As apparent form FIG.. 3, both the distributions are substantially identical with each other in light quantity (area defined by each curve) and peak level. However, the distribution in respect of the r direction is such that the curve is sharp near the peak level and wide at the bottom, while the distribution in respect of the $\theta$ direction is such that the curve is gentle near the peak level.

Figure 5:
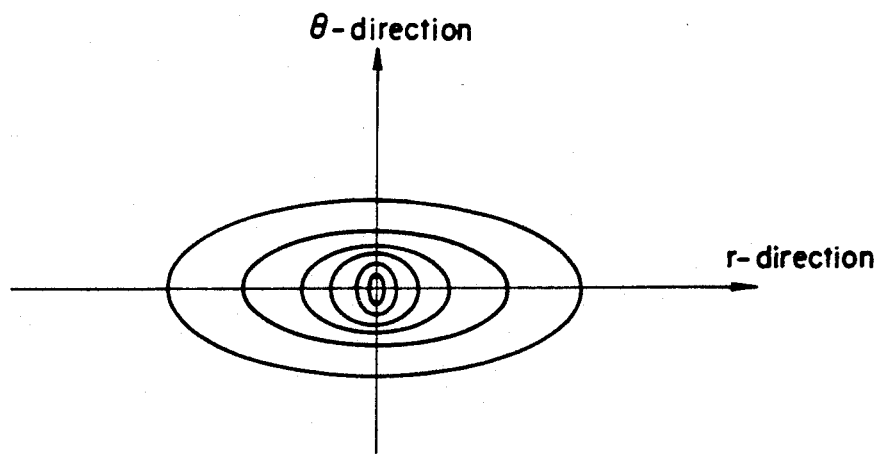
FIG. 5 is an iso-intensity diagram of the exposure beam.

That is, a width of the exposure beam at the light intensity level S on the surface of the substrate 11 is large in respect of the $\theta$ direction as shown in FIG. 3, and an iso-intensity diagram to be created in this case is shown in FIG. 5.

Figure 6:
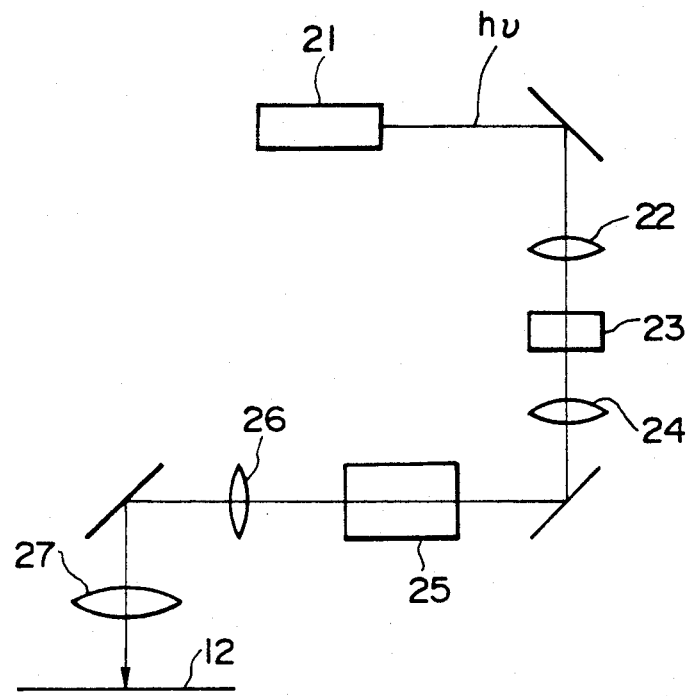
FIG. 6 is a construction diagram of a preferred embodiment of exposure means.

FIG. 6 shows a schematic construction of a preferred embodiment of exposure means for applying na exposure beam to the photoresist layer 12 on the substrate.

In this preferred embodiment shown in FIG. 6, a laser 21 is employed as an exposure beam source, and a laser beam $h\nu$ from the laser 21 is introduced through a condenser lens system 22 into an acoustooptic modulator (AOM) 23. I the AOM 23, the laser beam $h\nu$ is switched and modulated according to recording information, and it is made into parallel rays of light by a collimator lens system 24. Then, the beam enters control means 25 for providing different spot diameters $\phi_r$ and $\phi_c$ in respect of the r direction and the $\theta$ direction. Thereafter, a light intensity distribution of the beam having outgone from the control means 25 is made different between the r direction and the $\theta$ direction by cooperation of a condenser lens system 26 and an objective lens system 27. The beam from the objective lens system 27 is applied to the photoresist layer 12 on the substrate 11 which is rotated, and is spirally scanned on the photoresist layer 12, that is, displaced in both the r direction and the $\theta$ direction.

Figure 7:
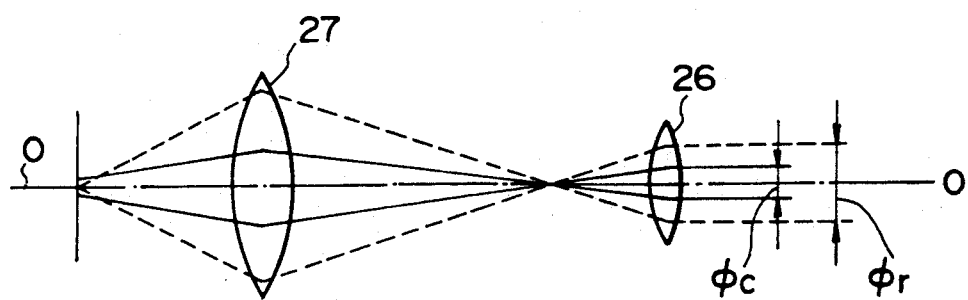
FIG. 7 is an optical path diagram in the cross section along the r direction and the $\theta$ direction.

FIG. 7 is an optical path diagram illustrating a preferred embodiment of a method of differentiating the light intensity distribution between the r direction and the $\theta$ direction. Referring to FIG. 7, a solid line represents an optical path in a cross section along a direction corresponding to the $\theta$ direction, and a dashed line represents an optical path in a cross section along a direction corresponding to the r direction. In this case, the exposure beam to be introduced from the control means 25 into the condenser lens system 26 has the spot diameter $\phi_c$ in respect of the $\theta$ direction and the spot diameter $\phi_r$ in respect of the r direction, wherein the relation between the spot diameters $\phi_c$ and $\phi_r$ is set to $\phi_c < \phi_r$.

Each of the condenser lens system 26 and the objective lens system 27 is symmetrical with respect to an optical axis 0—0 as usual.

As the relation between the spot diameters $\phi_c$ and $\phi_r$ of the beam entering the condenser lens system 26 is set to $\phi_c < \phi_r$, a numerical aperture N.A. of the objective lens system 27 which value is defined as n sinu (n: refractive index; u: angle of incident light with respect to an optical axis) becomes different between the r direction and the $\theta$ direction. Therefore, the light intensity distribution of the beam spot of the outgoing light from the objective lens system 27 on the photoresist layer 12 becomes different between the r direction and the $\theta$ direction as shown in FIGS. 3 and 5.

Figure 8:
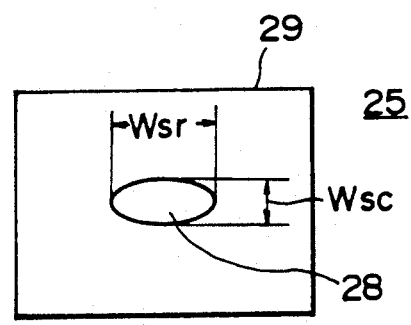
FIG. 8 is an elevational view of a preferred embodiment of control means for the exposure beam.

FIG. 8 shows a preferred embodiment of the control means 25 for making the spot diameter of the beam entering the condenser lens system 26 become different between the r direction and the $\theta$ direction. Referring to FIG. 8, the control means 25 is formed from a light shielding member 29 having a slit 28. The slit 28 has a width $W_{sr}$ in a direction corresponding to the r direction and a width $W_{sc}$ in a direction corresponding to the $\theta$ direction, wherein the relation between the widths $W_{sr}$ and $W_{sc}$ is set to $W_{sr} > W_{sc}$.

Figure 9:
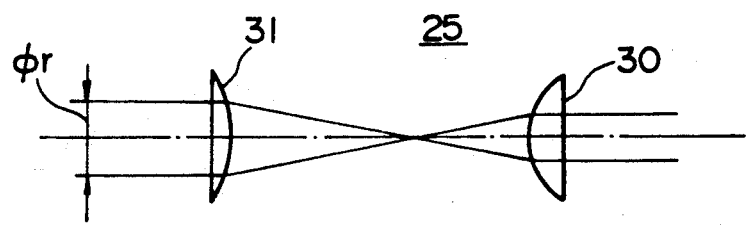
FIG. 9 is an optical path diagram of another preferred embodiment of the control means for the exposure beam.
Figure 10A:
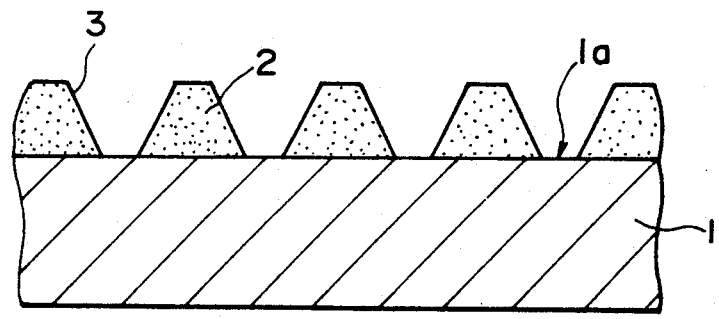
FIGS. 10A to 10D are sectional views illustrating the steps of the making method for the optical disk in one example of the prior art.
Figure 10B:
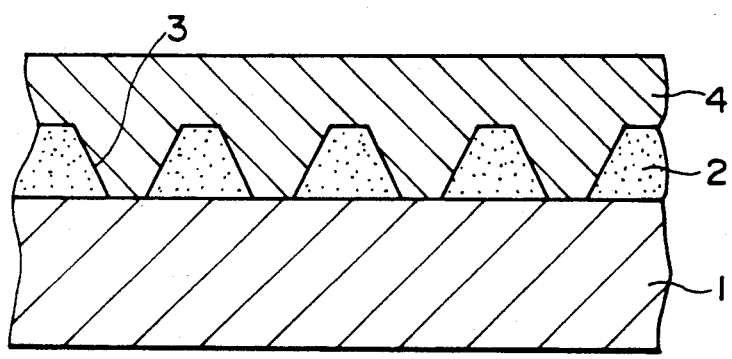
Figure 10C:
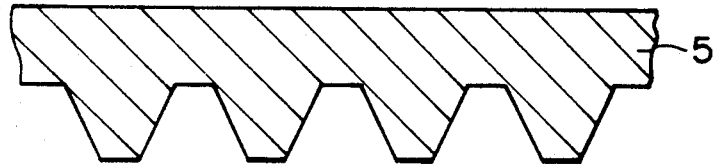
Figure 10D:
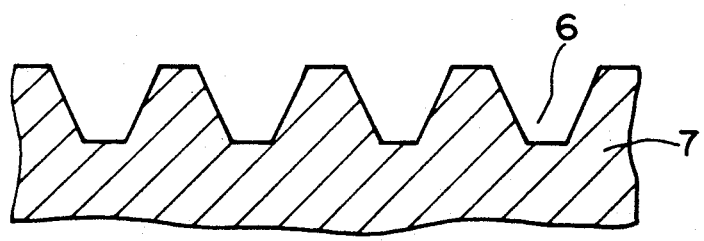
Figure 11A:
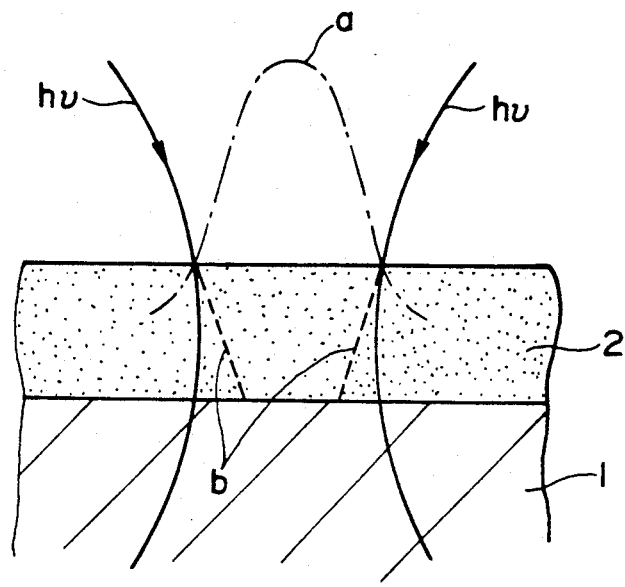
FIGS. 11A and 11B are sectional views illustrating the formation of an aperture through a photoresist.
Figure 11B:
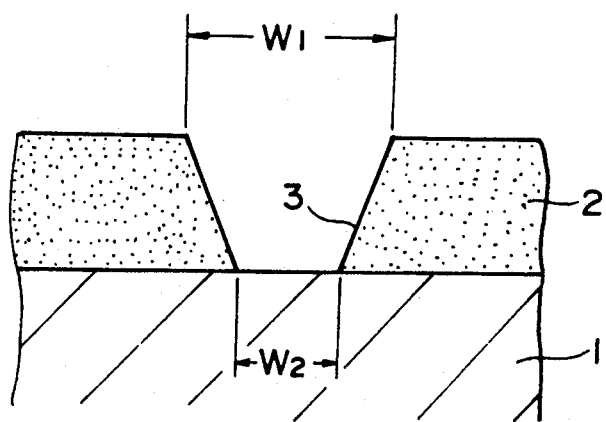
Figure 12A:
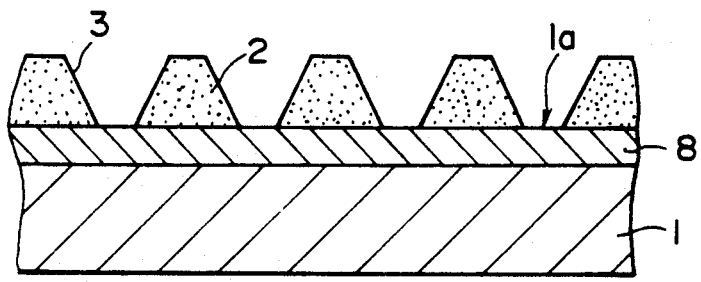
FIGS. 12A to 12E are sectional views illustrating the steps of the making method for the optical disk in another example of the prior art.
Figure 12B:
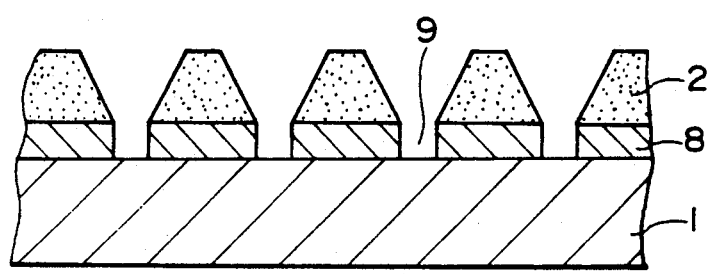
Figure 12C:
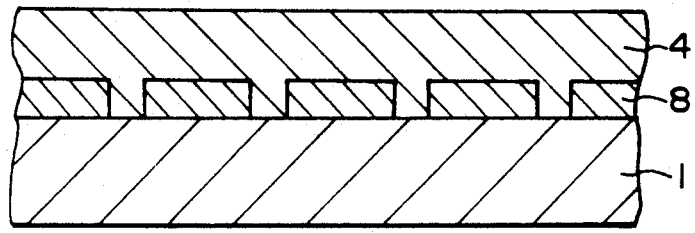
Figure 12D:
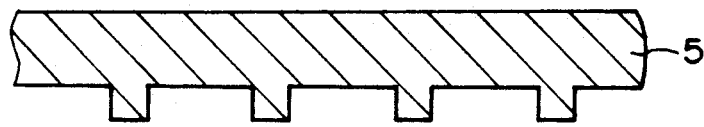
Figure 12E:
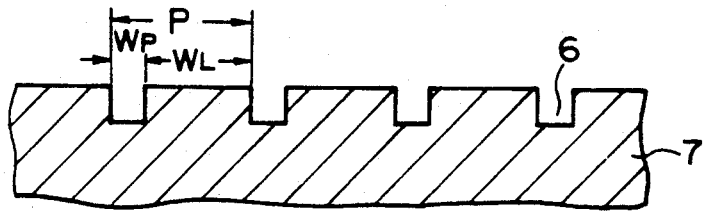

FIG. 9 shows another preferred embodiment of the control means 25, in which a cylindrical condenser lens 30 and a cylindrical collimator lens 31 having a lens function in respect of the direction corresponding to the r direction are combined, and the relation between a focal distance $f_0$ of the condenser lens 30 and a focal distance $f_1$ of the collimator lens 31 is set to $f_1 > f_0$. Accordingly, the diameter of the beam having entered the condenser lens 30 can be enlarged only in the direction corresponding to the r direction.

Although not shown, as a further embodiment of the control means 25, an AOM having a characteristic that a cross section of an outgoing light therefrom becomes somewhat flat may be located between a cylindrical condenser lens and a cylindrical collimator lens, and a focal distance of the condenser lens may be set to be larger than a focal distance of the collimator lens.

The photoresist layer 12 is exposed to light by using the exposure means mentioned above, and subsequent development is carried out to form the apertures 13 each having different widths in respect of the r direction and the $\theta$ direction as shown in FIGS. 1 and 2. Then, anisotropic etching of the substrate 11 through the apertures 13 is carried out with the photoresist layer 12 used as an etching mask, thus forming the recesses 19 on the substrate 11.

As shown in FIG. 1, a width of each recess 19 in respect of the r direction can be reduced by the small width $W_{2r}$ of each aperture 13, so that a pitch $P_r$ can be sufficiently reduced. On the other hand, a width of each recess 19 in respect of the $\theta$ direction can be enlarged by the large width $W_{2c}$ of each aperture 13, so that the duty ratio can be made to 1:1 in a constant pitch $P_c$.

Finally, the optical disk 17 can be made from the substrate 11 having the recesses 19 or on the basis thereof.

While the recesses 19 are formed on the substrate 11 such as a glass substrate in the above preferred embodiment, various changes and modifications may be made in the present invention. For example, as similar to the construction shown in FIGS. 12A to 12E, the substrate 11 may be constituted of a glass substrate and a metal layer with a desired thickness as a surface layer formed on the surface of the glass substrate, and the metal layer may be etched through the apertures 13 of the photoresist layer 12 to form the recesses 19 each having a depth corresponding to the thickness of the metal layer.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A making method for a high-density optical disk comprises the steps of:
    forming a photoresist layer on a substrate, forming a plurality of apertures through said photoresist layer by selective exposure and development according to recording information, each of said apertures having a width o the side of said substrate smaller than a width on the side of incidence of an exposure beam spot, and etching said substrate through said apertures, wherein a light intensity distribution of said exposure beam spot for forming said apertures is different between a radial direction and a circumferential direction of said optical disk so that the width of said each aperture on the side of said substrate is small in respect of the radial direction of said optical disk and large in respect of the circumferential direction of said optical disk.

2. The making method according to claim 1, wherein a plurality of recesses and lands are formed on said substrate by said etching step, and a width of said each recess and a width of said each land formed between the adjacent ones of said recesses in respect of the circumferential direction of said optical disk are substantially equal to each other.

3. The making method according to claim 1, wherein the width of said each aperture on the side of said substrate in respect of the radial direction of said optical disk is smaller than that in respect of the circumferential direction of said optical disk.

4. The making method according to claim 1, wherein the light intensity distribution is made different between the radial direction and the circumferential direction of said optical disk by using control means for differentiating a spot diameter of light beam entering a condenser lens system in respect of a direction corresponding to the radial direction from a spot diameter of the light beam in respect of a direction corresponding to the circumferential direction.

5. The making method according to claim 4, wherein the spot diameter in respect of the direction corresponding to the radial direction is larger than the spot diameter in respect of the direction corresponding to the circumferential direction.

6. The making method according to claim 4, wherein said control means comprises a light shielding member having a slit, and a width of said slit in respect of the direction corresponding to the radial direction is larger than that in respect of the direction corresponding to the circumferential direction.

7. The making method according to claim 4, wherein said control means comprises a cylindrical condenser lens and a cylindrical collimator lens having a lens function in respect of the direction corresponding to the radial direction, and a focal distance of said cylindrical condenser lens is smaller than that of said cylindrical collimator lens.

8. A high-density optical disk comprises:
    a substrate and a plurality of apertures arranged in a desired pattern according to the recording information on said substrate, wherein the width of said each aperture on the side of said substrate in respect of the radial direction of said optical disk is smaller than that in respect of the circumferential direction of said optical disk and a ratio between a length of each pit and a length of each land in respect of the circumferential direction is about 1:1.

* * * * *